Figure 1:
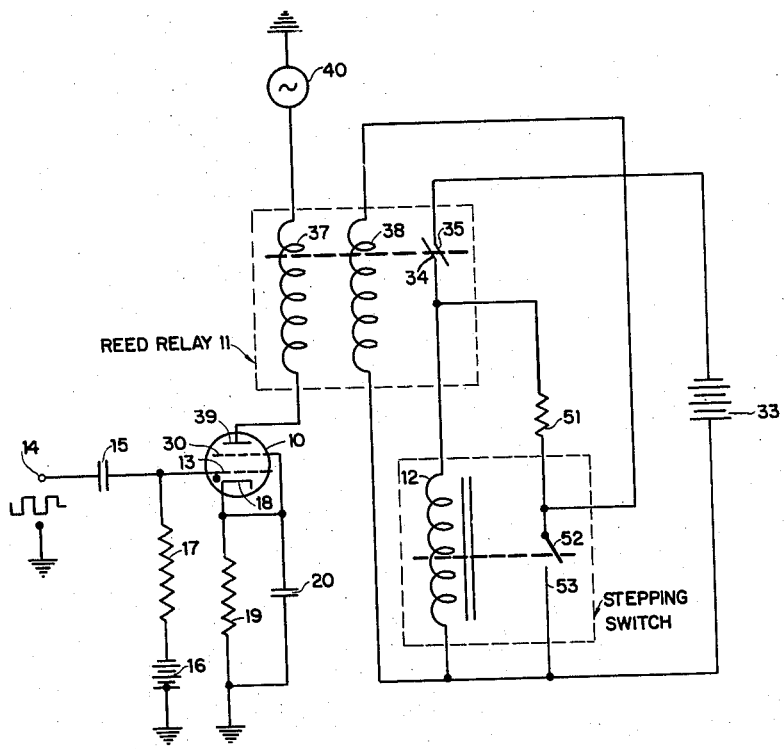

Sept. 1, 1964

R. E. VOYLES 3,147,409

PULSE DRIVER

Filed May 2, 1961

INVENTOR.
RICHARD E. VOYLES
BY *Louis J. Knobbe*
ATTORNEY

United States Patent Office 3,147,409
Patented Sept. 1, 1964

3,147,409
PULSE DRIVER
Richard E. Voyles, El Sobrante, Calif., assignor to Beckman Instruments, Inc., a corporation of California
Filed May 2, 1961, Ser. No. 107,229
5 Claims. (Cl. 317—155.5)

This invention relates to pulse driver circuitry and, more particularly, to a circuit for extending the width of an input pulse.

Certain electrical and electronic components require input voltage and current pulses having a predetermined relationship between the pulse height and pulse width. By way of example, the coil of a stepping switch relay magnet requires an input pulse of predetermined duration. This duration period is determined by the voltage applied to the coil, the type of winding used, the efficiency of the magnetic circuit, and the mechanical load ot be moved by the relay magnet. Thus, if the source of input pulses is unable to generate a pulse of this required length, the only remedy available for a predetermined relay coil is to increase the voltage and/or current applied to the coil. Oftentimes, however, this is not a satisfactory solution, particularly if it requires overloading either the source of input pulses or the relay coil or both.

A specific example of the aforementioned problem is encountered in driving the relay magnet of a multicontact rotary stepping switch from the output of a gas thyratron. With alternating current applied to the thyratron anode, the thyratron can fire only during the positive half cycles of the anode voltage. Thus, for a 60 cycle alternating current, the output pulse cannot exceed approximately 16 milliseconds. The usable voltage and current pulse available to drive the stepping switch is somewhat less than this period, e.g., 6 to 8 milliseconds. A pulse of this short duration is insufficient for driving many commonly available stepping switches unless a very high peak current is provided by the thyratron. If, as is often the case, this high current exceeds the rating of the thyratron, the life of this component will be materially shortened. Moreover, these high current pulses cause excessive wear of the stepping switches.

A further disadvantage of the prior art pulse driving circuits is that they are affected by changes in line voltage. Since the width of the pulse supplied by the prior art devices remain constant, low line voltage and high line voltage will deliver substantially different amounts of driving power to the output load.

Accordingly, it is an object of the present invention to provide a pulse driver circuit for supplying output pulses which have a greater width than the input pulses applied thereto and which are not limited in width by the frequency of the alternating current power line.

Another object of this invention is to provide a pulse driver circuit for supplying output pulses of relatively constant power regardless of changes in the power line voltage.

It is a further object of this invention to provide a circuit for delivering output pulses having a duration determined by the operating requirements of the output device.

Other and further objects, features and advantages of the invention will become apparent as the description proceeds.

Briefly, in accordance with a preferred embodiment of the present invention, there is provided a reed relay having a pair of contacts which may be actuated by applying current through either a first or second relay coil. The reed relay contacts are in series circuit with a power source and the output device, e.g., a stepping switch magnet coil. An additional series circuit includes the power source, the reed relay contacts and the second relay coil. The input pulse is applied to the first relay coil which causes the contacts to close and provide power to both the output device and the second relay coil. Therefore, although the input pulse terminates before a pulse of sufficient duration has been applied to the stepping switch magnet coil, the reed relay contacts remain closed because of the energization of the second relay coil. This relay coil remains energized until the output device has been successfully actuated.

As described hereinafter, the aforementioned apparatus has particular utility in combination with a gas thyratron pulse generator. For example, the aforementioned first relay coil may be connected between the source of alternating current and the anode of the gas thyratron, so as to be energized during the relatively short period in which the thyratron is fired. Although the duration of this output pulse is insufficient for closing the stepping relay armature unless overload currents or voltages are employed, the present invention extends the pulse duration period until the stepping switch becomes fully energized. Thus, the output current and/or voltage pulse required from the gas thyratron can be substantially smaller than that required when the stepping switch is driven directly from the output of the gas thyratron.

Figure 2:
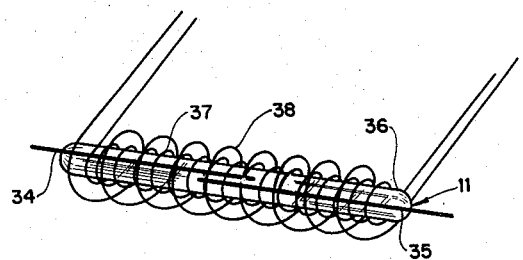

A more thorough understanding of the invention may be obtained by the following detailed description taken in connection with the accompanying drawing in which:

FIG. 1 is a schematic drawing of one embodiment of a pulse driver constructed in accordance with the present invention; and FIG. 2 is a perspective view of a preferred reed relay for use in pulse driving circuits constructed in accordance with the present invention.

Referring now to FIG. 1, there is shown a schematic of a preferred embodiment of this invention which comprises in combinaton gas thyratron 10, reed relay 11 and stepping switch magnet coil 12. The control grid 13 of gas thyratron 10 is connected to an input terminal 14 via coupling capacitor 15 and to a negative bias source 16 via resistor 17. The cathode 18 of the gas thyratron tube is connected to ground via parallel connected resistor 19 and capacitor 20. The shield grid 30 of the gas thyratron is connected to the cathode thereof. The gas thyratron may be utilized for providing relatively large current output pulses having the same recurrence frequency as the pulse source connected to input terminal 14 or a subharmonic thereof. Thus, if resistor 19 and capacitor 20 are selected to form a long time constant circuit, the firing of the thyratron may be delayed for one or more input cycles; thyratron 10 then functions as a frequency divider.

As noted above, the source of alternating current applied to the anode of the gas thyratron is oftentimes at a sufficiently high frequency that the output pulse supplied to a load is of relatively short duration. It has, therefore, been necessary heretofore to draw an exceedingly high current from the thyratron during the time that it is fired in order to successfully operate loads such as stepping relays. These exceedingly high peak currents not only adversely affect the longevity of the thyratron but also may cause excessive wear of the load coupled thereto. In the present invention, however, the load shown as stepping switch coil 12 is connected to a source of power illustrated as battery 33 via the contacts 34, 35 of reed relay 11 instead of directly to the output of thyratron 10. As described hereinafter, the contacts 34, 35 of the reed relay are easily closed without exceeding the recommended thyratron voltage and current maximum values. Additional circuitry also hereinafter described maintains these contacts closed beyond the duration of the output pulse provided by the thyratron.

A representative reed relay 11 is illustrated in FIG. 2 and comprises a sealed capsule 36 enclosing the magnetic reed contacts 34 and 35. First and second relay coils 37 and 38 are wound in the form of respective helixes around the capsule as shown. A flow of current through either of these coils generates a magnetic field. The reeds 34 and 35 serve as both a magnetic core and armature and are closed in response to the generated magnetic field. The reed relay shown is a "dry" type of reed relay; other reed relays include a small pool of mercury within the capsule for wetting the ends of the reeds so as to provide a clean electrical contact each time the relay is actuated. As is well known in the art, reed relays are very "fast" relays, that is, they are closed in response to very narrow input pulses, e.g. 6 milliseconds. As such, they are easily driven by thyratrons and therefore well adapted for use in the present invention.

Referring again to FIG. 1, the first coil 37 of the reed relay is connected between the anode 39 of the thyratron and a source of alternating current 40. The second coil 38 of the reed relay is connected to battery 33 through reed relay contacts 34, 35 and resistor 51. The second reed relay coil is also connected in shunt with normally open interrupter contacts 52, 53. As shown, these contacts are actuated under the control of the stepping switch coil 12 and are closed each time the stepping relay has completed its advance to a new contact position.

The operation of the circuit of FIG. 1 is as follows: A positive pulse applied to input terminal 14 causes the thyratron to fire for each positive cycle of the alternating current supplied by source 40. Current then flows in the first relay coil and causes contacts 34 and 35 to close thereby energizing the second reed relay coil 38 from source 33. Accordingly, even though the gas thyratron is extinguished after only a short time has elapsed, the contacts 34, 35 are held closed by the current flowing through the second reed relay coil 38. Power is therefore supplied to the stepping switch coil 12 from source 33 after the thyratron 10 is extinguished. When the stepping switch finally becomes fully energized so as to advance to a new position, the normally open interrupter contacts 52, 53 close thereby shunting the second reed relay coil 38. Contacts 34, 35 are then released and power removed from the stepping switch coil 12. Resistor 51 prevents overloading of the power source 33 while the second reed relay coil 38 is shunted. Thus, power is delivered to the load for the necessary time period regardless of the width of the input pulse.

An additional and significant advantage of the present invention is that it is substantially unsusceptible to changes in line voltage. Thus, if the stepping switch coil is driven directly by a thyratron, the height of the driving pulse supplied thereto is directly proportional to the line voltage while the width of the driving pulse remains constant. However, in the present invention, the width of the pulse is determined by how long it takes the stepping switch to become full energized. Therefore, a low line voltage causes the duration of the driving pulse to lengthen and a high line voltage causes it to shorten so that the total driving power remains relatively constant.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim:

1. A pulse driving circuit comprising a reed type relay having a pair of contacts and first and second coils adapted for actuating said contacts, means connecting said pair of contacts in series with a stepping switch coil and a power source, an input terminal connected to said first coil; a resistor; means connecting in series said second coil, said resistor, said pair of contacts, and said power source; a pair of normally open interrupter contacts are responsively coupled to said stepping switch coil so as to be closed when the stepping switch becomes fully energized, and means connecting said pair of interrupter contacts in shunting relationship with said second coil.

2. A circuit for driving a load in response to an input pulse of insufficient duration for actuating said load comprising a normally open pair of contacts which are actuated to a closed circuit condition in response to current flowing in either a first circuit or a second circuit; means for connecting said first circuit to said input pulse; a power source; means for interconnecting said power source, said pair of contacts, and said second circuit so that said pair of contacts connect said power source to said second circuit and thereby maintain said contacts in a closed circuit condition after cessation of said input pulse; and means for interconnecting said load, said power source, and said pair of contacts so that said load is connected to said power source during the period that said contacts are maintained in a closed circuit condition.

3. A circuit for driving a load in response to an input pulse of insufficient duration for actuating said load comprising a normally open pair of contacts which are actuated to a closed circuit condition in response to current flowing in either a first circuit or a second circuit; means for connecting said first circuit to said input pulse; a power source; means for interconnecting said power source, said pair of contacts, and said second circuit so that said pair of contacts connect said power source to said second circuit and thereby maintain said contacts in a closed circuit condition after cessation of said input pulse; means for interconnecting said load, said power source and said pair of contacts so that said load is connected to said power source during the period that said contacts are maintained in a closed circuit condition; and means for interrupting the current flow through said second circuit in response to complete actuation of said load.

4. A pulse driving circuit comprising in combination a gas thyratron having its control grid connected to an input terminal, a reed-type relay having a pair of contacts and first and second coils adapted for actuating said contacts, means for connecting the anode of said gas thyratron to a source of alternating current through said first coil, a stepping switch coil; means connecting said stepping switch coil to a direct current power source through said reed relay contacts; a resistor; and means connecting said second coil to said direct current power source through said resistor and reed relay contacts.

5. A pulse driving circuit described in claim 4 wherein a pair of normally open interrupter contacts are adapted to be closed in response to complete actuation of the stepping switch, and means connecting said pair of interrupter contacts in shunting relationship with said second coil.

References Cited in the file of this patent
UNITED STATES PATENTS
2,834,923   England _____ May 13, 1958